United States Patent
Pujol et al.

(10) Patent No.: US 8,713,125 B2
(45) Date of Patent: Apr. 29, 2014

(54) METHOD AND SYSTEM FOR SCALING USAGE OF A SOCIAL BASED APPLICATION ON AN ONLINE SOCIAL NETWORK

(75) Inventors: Josep M. Pujol, Madrid (ES); Georgos Siganos, Madrid (ES); Vijay Erramilli, Madrid (ES); Xiaoyuan Yang, Madrid (ES); Nikolaos Laoutaris, Madrid (ES); Parminder Chabbra, Madrid (ES); Pablo Rodriguez, Madrid (ES)

(73) Assignee: Telefonica, S.A., Madrid (ES)

( * ) Notice: Subject to any disclaimer, the term of this patent is extended or adjusted under 35 U.S.C. 154(b) by 326 days.

(21) Appl. No.: 12/968,515

(22) Filed: Dec. 15, 2010

(65) Prior Publication Data

US 2011/0276649 A1 Nov. 10, 2011

Related U.S. Application Data

(60) Provisional application No. 61/332,860, filed on May 10, 2010.

(51) Int. Cl.
G06F 15/16 (2006.01)

(52) U.S. Cl.
USPC .............. 709/208; 709/211; 709/227; 726/18

(58) Field of Classification Search
USPC .............. 709/208–211, 227–228; 726/17–19
See application file for complete search history.

(56) References Cited

U.S. PATENT DOCUMENTS

| | | | | |
|---|---|---|---|---|
| 5,815,649 A * | 9/1998 | Utter et al. | ..................... | 709/215 |
| 6,523,032 B1 * | 2/2003 | Sunkara et al. | ............... | 709/211 |
| 8,108,352 B1 * | 1/2012 | Iyer et al. | ..................... | 707/661 |
| 8,307,086 B2 * | 11/2012 | Whitnah et al. | ............... | 709/228 |
| 8,387,110 B1 * | 2/2013 | Cooper | ........................... | 726/17 |
| 8,468,253 B2 * | 6/2013 | Guzman et al. | ............... | 709/227 |
| 2008/0222295 A1 * | 9/2008 | Robinson et al. | ............. | 709/227 |
| 2010/0180337 A1 * | 7/2010 | Bajekal | ........................... | 726/19 |

\* cited by examiner

*Primary Examiner* — Bharat N Barot
(74) *Attorney, Agent, or Firm* — Katten Muchin Rosenman LLP

(57) ABSTRACT

Method, system and computer program to provide transparent scalability to Online Social Networks and better performance of its back-end databases, by an efficient partitioning of the underlying community structure and replicating of user profiles, ensuring that every user has a master or slave replica of all his neighbors on the same partition where he is located.

11 Claims, 4 Drawing Sheets

METHOD AND SYSTEM FOR SCALING USAGE OF A SOCIAL BASED APPLICATION ON AN ONLINE SOCIAL NETWORK

FIELD OF THE INVENTION

The present invention relates to a method and system for Online Social Networks (OSNs) scalability and more precisely, for partitioning and replication of the data of a social network to ease scalability and improve performance of datastores.

STATE OF THE ART

There has been an unprecedented increase in the use of Online Social Networks (OSNs) and applications with a social component. The most popular ones attract hundreds of millions of users, e.g., Facebook, QQ, deliver status updates at very high rates, e.g., Twitter, and distribute user generated content (UGC) at a global scale, e.g., YouTube. OSNs differ from traditional web applications on multiple fronts: they handle highly personalized content, encounter non-traditional workloads, but most importantly, deal with highly interconnected data due to the presence of strong community structure among their end users.

All these factors create new challenges for the maintenance, management, and scaling of OSN systems. Scaling real systems is particularly acute for OSNs due to their astounding growth rate. Twitter for example grew by 1382% between February and March 2009 and was thus forced to redesign and reimplement its architecture several times in order to keep up with the demand. Other OSNs that failed to do so ceased to exist.

A natural solution to cope with higher demand is to upgrade existing hardware. Such vertical scaling, however, is costly since high performance clusters and even middle-tier servers remain expensive. For instance, Facebook requires Terabytes of memory across thousands of machines, making it infeasible to scale vertically.

A more cost efficient approach is to rely on horizontal scaling by engaging a higher number of cheap commodity servers and partitioning the work among them. The advent of cloud computing systems like Amazon EC2 and Google App Engine has streamlined horizontal scaling by removing the need to own hardware and instead allowing to lease virtual machines (VMs) dynamically from the cloud. Cloud based horizontal scaling seems to have solved most of the scaling problems faced by traditional web applications, however, they require using APIs that are tied to a particular cloud provider and thus suffer from poor portability which can lead to architectural lock-in to a particular cloud provider.

The application front-end and logic are stateless and can be deployed on independent commodity servers to meet the current demand. A similar strategy can be employed for the back-end data layer, as long as the corresponding data can be partitioned into independent components, and these components can be stored on independent VMs running Relational DataBase Management Systems (RDBMS), Key-Value stores like Cassandra, etc. In the case of OSNs, the existence of social communities hinders the partitioning of the back-end into clean, disjoint components that can run on RDBMS hosted at independent VMs.

The problem is caused by users that belong to more than one community. Such users, even if placed on the same server with neighbours from their primary community, cause lot of inter-server traffic for resolving queries originating from their neighbours in other communities affecting the query execution time. The problem becomes particularly acute under random partitioning solution, which it is often used in practice (Facebook, Twitter). On the other hand, replicating user profiles on multiple or all the servers eliminates the inter-server traffic for reads but increases the replications overhead. This impacts negatively on multiple fronts, including the query execution times (of much larger database tables), the network traffic for propagating updates and eventually, the ability to maintain consistency across many replicas. Thus, scalability for OSNs is a complex issue An obvious set of candidates that can be used to address the problem include graph partitioning algorithms and algorithms that find communities in social graphs. These algorithms either work by trying to find equal sized partitions of a graph such that the inter-partition edges are minimized or they rely on optimizing a metric called modularity that represents the quality of partitions produced.

The four main reasons why these methods are inadequate for OSNs purpose follows:

Most of these algorithms are offline and cannot gracefully handle the dynamics of OSNs.

Algorithms based on community detection are known to be extremely sensitive to input conditions, with nodes being assigned to different partitions/communities with little changes to the structure. In other words they are not stable.

The graph partitioning algorithms mentioned above minimize inter-partition edges. However this does not guarantee local semantics. Actually it can add replicas post-hoc producing partitions, guaranteeing local semantics but this leads to high replication overhead.

It can be argued that reducing the number of inter-partition edges relates to reducing the number of replicas. However, in some cases this may not be true. FIG. 1 is illustrative example on why minimizing edges between partitions does not minimize replicas. A cut along P2 and P3 (middle) minimizes the edges, while a cut along P1 and P2 minimizes the replicas (right).

The main characteristics of previous state of the art regarding this field are:

Scaling Out: Scaling-out in software is provided by current cloud providers like Amazon EC2 and Google's AppEngine as well as companies like RightScale, by giving the ability to launch virtual instances as and when needed to cope with demand. However they provide scaling out for the frontend of the application and the backend as long as the data in the backend is independent.

Key-Value Stores: Many popular OSNs today rely on Key-Value stores that are Dynamic Hash Table (DHT) based to deal with scaling problems in the backend (e.g. Facebook uses Cassandra). While these key-value stores have provided scalability, these stores rely on random partitioning of backend data, that can lead to poor performance in the case of OSN workloads.

Distributed File Systems and Databases: Distributing data for performance, availability and resilience reasons has been widely studied in the file system and database systems community. Ficus and Coda are Distributed File Systems (DFS) that replicate files for high availability. Farsite is a DFS that achieves high availability and scalability using replication. Distributed relational DataBase (DB) systems like Bayou allow for disconnected operations and provide eventual data consistency.

In conclusion, the difficulty of partitioning social graphs has introduced new system design challenges for scaling of Online Social Networks (OSNs). Vertical scaling by resorting to full replication can be a costly proposition. Scaling horizontally by partitioning and distributing data among multiple servers using, for e.g., DHTs, can suffer from expensive inter-server communication. For instance, random partitioning solutions split data to thousands of database servers, which are then queried with multi-get requests at high speed over the network to fetch a neighbours' user data. That can result in unexpected response times, determined by the latency of the worse server, and could be particularly acute under heavy data center loads, where sudden network delays, network jitter or network congestion can cause performance problems. In addition to potential network problems, individual servers could also suffer performance problems such as disk I/O and CPU bottlenecks, driving down the performance of the system. For instance, servers could become CPU bounded as they need to handle a large of query requests from other servers. When servers' CPU is bound, adding more servers does not help serve more requests. Using more servers decreases the bandwidth per server, however, it does not decrease the number of request per server which means that CPU usage stays roughly the same. In addition, random partition also hinders the servers' cache/memory hit ratios.

SUMMARY OF THE INVENTION

In this context, it is introduced SPAR, a Social Partitioning and Replication middle-ware. It is a primary aim of this invention to mediate transparently between the application and the data layer of an OSN through joint partitioning and replication of the underlying community structure in such a way that it is ensured that all the data needed is local. in order to ease scalability and improve performance of the data-stores SPAR is an On-line Transaction Processing system and not a Content Distribution Network (CDN) for serving OSN related content like images and videos or large documents. SPAR is intended to aid the data-store of the OSN, but not the actual content belonging to users which often served by standard CDNs. Also it is not intended to characterize or compute properties of OSN graph.

In particular, it is an object of the present invention a method for leverages the underlying social graph structure in order to minimize the required replication overhead for ensuring that users have their neighbours' data co-located in the same machine or server and therefore providing local semantics.

The gains from this are multi-fold: application developers can assume local semantics, i.e., develop as they would for a single machine; and scalability is achieved by adding commodity machines with low memory and network I/O requirements where redundancy is achieved at a fraction of the cost.

Most of the relevant data for a user in an OSN is one-hop away (friends, followers, etc.). SPAR reduces the impact of said multi-get operations as relevant data is kept local, avoiding potential network and server bottlenecks and thus serving more requests faster. This is achieved by replicating and ensuring that data pertaining to all one-hop neighbours of a user is co-located with the user, saving inter-server traffic and network related costs. Thus, to achieve local semantics it is needed to ensure that for every master replica of a user, either a master replica or a slave replica of all its direct neighbours are co-located on the same server. The term replica is used to refer to a copy of the user's data. It is differentiated between master replica (serving read/write operations) and the slave replica required for redundancy and to guarantee data locality.

The present invention proposes, in a first aspect, a method for efficient partitioning and replication in social based applications to provide simple and transparent scalability of an Online Social Network.

When a new bidirectional relationship, edge, is created between a first user and a second user is proposed, the method comprising the following steps:
  Checking if the masters replica of the first user profile is already co-located with the master replica of the second user in the same partition, or with a master's slave replica of the second user profile in the same partition,
    if so, no further action is required.
    if not, calculating the number of replicas that would be generated for each of the three possible configurations which comprise:
      no movements of masters.
      the first master goes to the partition containing the second master.
      the opposite, the second master goes to the partition containing the first one.
  Ensuring the following restrictions:
    1) There is exactly one master replica copy of a user in the system.
    2) Every master's replica of a user has a master or slave replica of all his neighbours on the same partition, being neighbours all the users with a relationship established with said user.
    3) Load balance of masters across the partitions.
    4) For the sake of redundancy, every user has at least K replica slaves, being K a system design parameter.
  Selecting from previous configurations the one that yields the smallest aggregate number of replicas.

In another aspect, a system comprising means adapted to perform the above-described method is presented.

Finally, a computer program comprising computer program code means adapted to perform the above-described method is presented.

For a more complete understanding of the invention, its objects and advantages, reference may be had to the following specification and to the accompanying drawings,

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF PREFERRED EMBODIMENTS OF THE INVENTION

This invention is obviously not limited to the specific embodiments described herein, but also encompasses any variations that may be considered by any person skilled in the art (for example, as regards the choice of components, configuration, etc.), within the general scope of the invention as defined in the appended claims.

In the context of the present invention, the term "comprises" and its derivations (such as "comprising", etc.) should not be understood as excluding the possibility that what is described and defined may include further elements, steps, etc.

Figure 1:
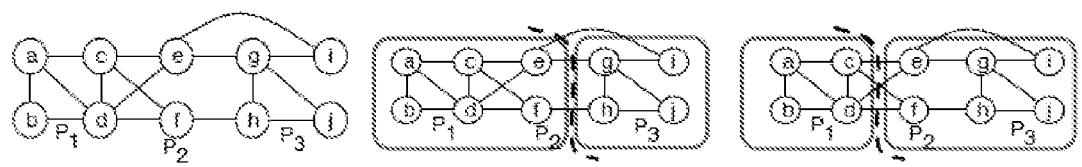
FIG. 1 shows an illustrative example on why minimizing edges between partitions does not minimize replicas.
Figure 2:
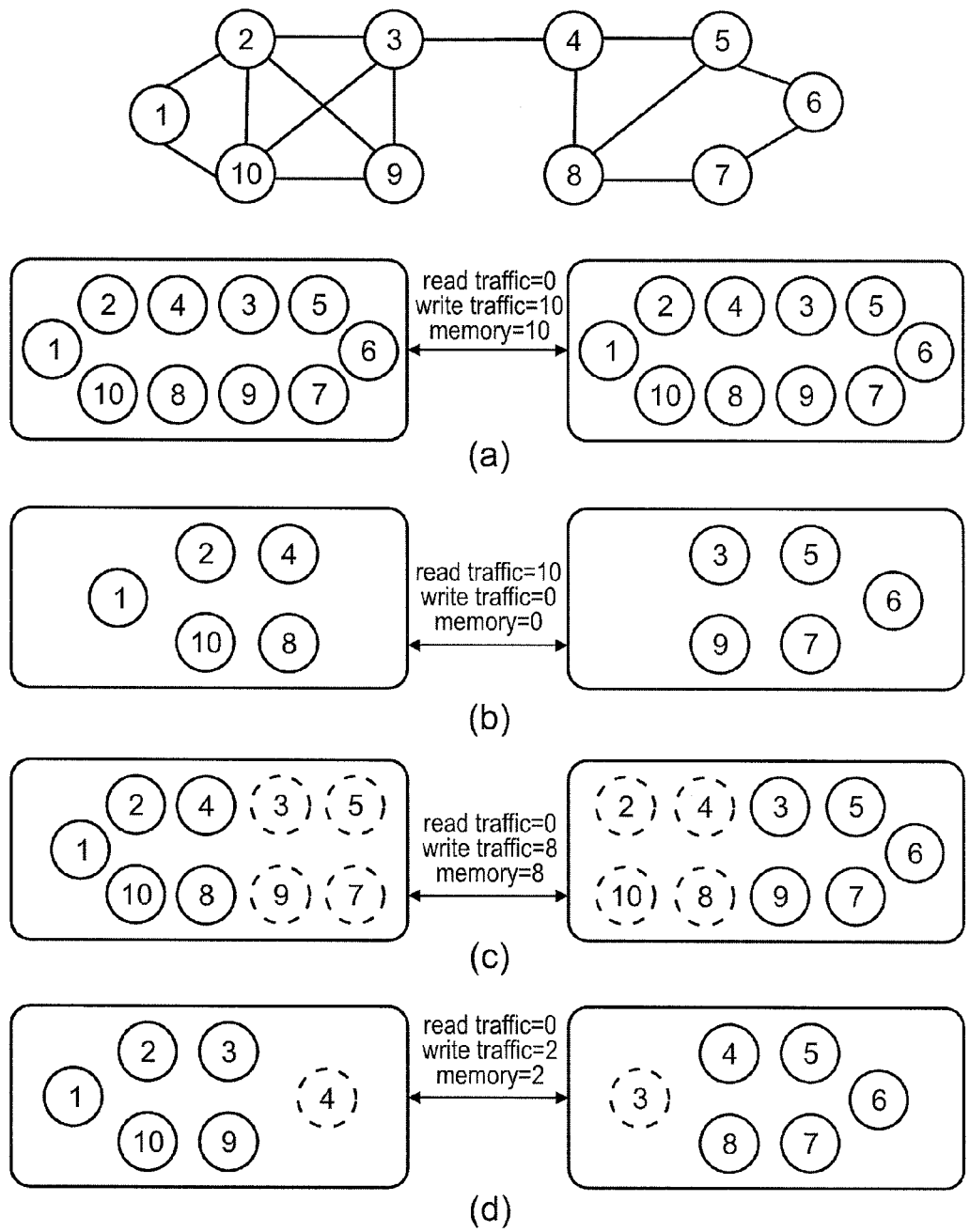
FIG. 2 shows a social graph with two distinct communities of users.

FIG. 2 shows why the two primitives in this invention, partitioning and replication, need to be performed jointly. On the top of FIG. 2 it is depicted a social graph with 10 profiles and 15 edges (bidirectional friendship relationships). The graph includes two distinct communities connected through "bridge" nodes 3 and 4. It is depicted the physical placement of profiles on 2 VM under the following schemes: (a) Full Replication (FR), (b) Random (or Hash based) Partitioning (RP), (c) Random Partitioning with Replication of missing neighbors (RPR), (d) the one from present invention, Social Partitioning and Replication (SPAR). It is summarized the memory and network cost of the different solutions assuming unit-length profiles and a read rate of 1 for all profiles. From FIG. 2 emerge the following observations: RP minimizes the replication overhead (0 units) and thus can be implemented using the cheapest possible servers in terms of RAM. On the downside, RP imposes the highest aggregate network traffic due to reads (10 units) and thus increases the network I/O cost of the servers and the networking equipment that inter-connects them. Results get reversed with FR. In this case, network read traffic falls to 0 but the memory requirements get maximized (10 units) as well as high write traffic for maintaining consistency. RPR too eliminates network read traffic but still has high memory requirement and network write traffic. SPAR performs the best in terms of ensuring locality semantics with lowest overhead.

In order to fulfil the requirement of optimization to minimize the number of slaves (called here MIN REPLICA problem) it is used the following notation. Let G=(V,E) denote the social graph representing the OSN, with node set V representing user profiles, and edge set E representing (friendship) relationships among profiles. Let N=|V| denote the total number of profiles and M the number of available (virtual) machines for hosting the OSN. It is cast the problem as a integer linear program where pij denotes a binary decision variable that becomes 1 if and only if the primary of user is assigned to partition j, 1<=j<=M. Also rij denote a similar decision variable for a replica of user i assigned to partition j. Finally, let the constants ☐ii'=1 if {i, i'} exists in E capture the friendship relationships. The problem MIN REPLICA it is now stated as follows:

$$\varepsilon_{ii'}, \quad (1)$$

$$\min \sum_i \sum_j r_{ij}$$

$$\text{s.t.} \sum_{\forall j} p_{ij} = 1$$

$$p_{ij} + \epsilon_{ii'} \le p_{i'j} + r_{i'j} + 1, \forall i, j, i' \quad (2)$$

$$\sum_i (p_{ij}) = \sum_i (p_{i(j+1)}), 1 \le j \le M - 1 \quad (3)$$

$$\sum_j r_{ij} \ge k, \forall i \in V \quad (4)$$

Constraint 1 in the above formulation ensures that there is exactly one master copy of a user in the system. Constraint 2 ensures that all neighbors (masters or slave of the neighbors) of a user are on the same machine. Constraint 3 tries to distribute equal number of primaries across the machines and Constraint 4 encodes to the redundancy requirement.

SPAR design requirements include maintaining local semantics, balancing loads, failure resiliency, stability, and achieve minimal replication overhead in an online setting. It is proposed next a greedy heuristic as a solution to such requisites.

The method reacts to additions and removals of nodes, edges and servers (comprising six different events). Most of the above events are special cases or involve an edge addition. Edge addition event requires calculating the number of replicas and node movements needed to re-construct the local semantics required by the two edge-related master nodes. A greedy choice is made to minimizing replicas subject to an additional constraint to load balance the number of masters hosted on servers.

The algorithm can be implemented using Sij; the number of friends of node i in partition j and Rij; a binary value that becomes 1 if i is replicated at j. In the average case the required information is proportional to the product of the average node degree and the number of servers. The worst case of computational complexity of the algorithm is proportional to the highest node degree.

The said events comprised by the algorithm are:

Node addition: A new node is assigned to the partition with the fewest number of masters. In addition, K slaves are created and assigned to random partitions.

Node removal: When a node is removed, its master and all its slaves are removed. The states of the nodes that had a edge with it are updated.

Figure 3:
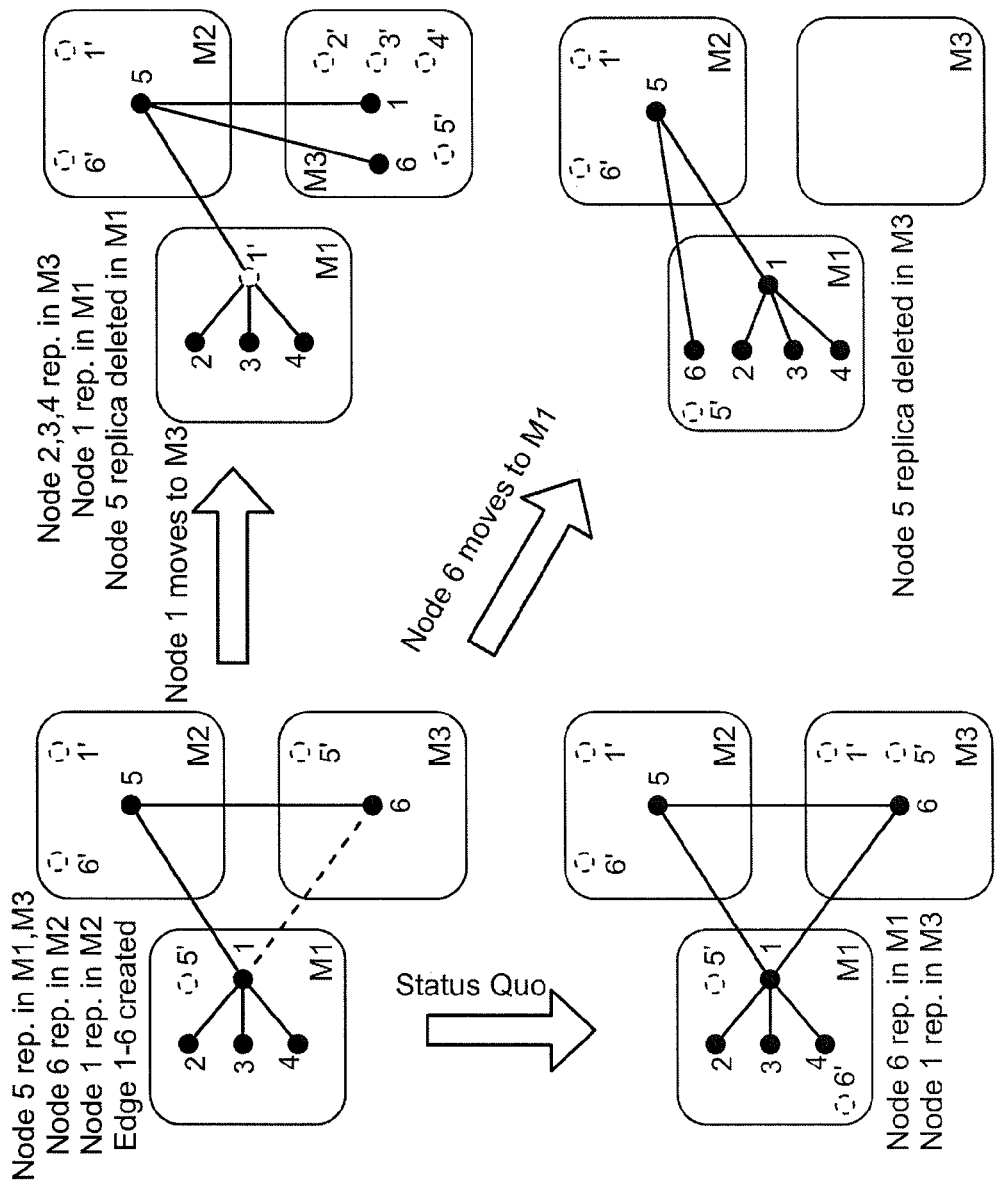
FIG. 3 shows an online sketch to illustrate the steps of edge addition description with an example.

Edge addition: When a new edge is created between nodes u and v, the algorithm checks whether both masters are already co-located with each other or with a master's slave. If so, no further action is required. If not, the algorithm calculates the number of replicas that would be generated for each of the three possible configurations: 1) no movements of masters, which maintain the status-quo, 2) the master of u goes to the partition containing the master of v, 3) the opposite. In this case of configuration 1), a replica is added if it does not already exist in the partition of the master of the complementary node. This can produce an increase of 1 or 2 replicas, depending on whether the two masters are already present in each other's partitions. This can occur if nodes v or u already have relationships with other nodes in the same partition or if there exist extra slaves of v or u for redundancy. This is important, since as it could be seen further, the end result is that SPAR needs fewer overall replicas to ensure both local semantics and K redundancy. In configuration 2) no slave replicas are created for u and v since their masters will be in the same partition. However, for the node that moves, in this case u, one might have to create a slave replica of itself in its old partition to service the master of the neighbours of u that were left behind in that partition. In addition, the masters of these neighbours will have to create a slave replica in the new partition—if they do not already have one—to preserve the local semantics of u. Finally the algorithm removes the slave replicas that were in the old partition only to serve the master of u, since they are no longer needed. The above rule is also subject to maintaining a minimum number of slave replicas due to redundancy K: the old partition slave will not be removed if the overall system ends up with less than K slaves for that particular node. Configuration 3) is just the complementary of 2). The algorithm greedily chooses the configuration that yields the smallest aggregate number of replicas subjected to the constraint of load-balancing the master across the partitions. More specifically, configuration 2) and 3) also need to ensure that the movement either happens to a partition with fewer masters, or to a partition for which the savings in terms of number of replicas of the best configuration to the second best one, is greater than the current ratio of load imbalance between partitions. FIG. 3 illustrates the steps just described with an example. The initial configuration (upper-left subplot) contains 6 nodes in 3 partitions. The current number of replicated nodes (empty circles) is 4. An edge between node 1 and 6 is created. Since there is no replica of 1 in M3 or replica of 6 in M1 if it is maintain the status quo two additional replicas will have to be created to maintain the local semantics. The algorithm also evaluates the number of required replicas that are required for the other two possible configurations. If node 1 were to move to M3, three replicas would need to be created in M3 since only 2 out of the 5 neighbours of node 1 are already in M3. In addition, the movement would allow removing the slave of node 5 from M1 because it is no longer needed. Consequently, the movement would increase the total number of replicas by 3−1=2 yielding a new total of 6 replicas, which is worse that maintaining the status quo of masters. In the last step, the algorithm evaluates the number of replicas for the third allowed configuration: moving the master of node 6 in M1. In this case the replica of node 5 in M3 can be removed because it already exists in M1 and no other node links to it in M3, thus, no replica needs to be created. The change on the number of replicas is −1, yielding a total of 3 replicas. Therefore, moving 6 to M1 minimizes the total number of replicas. However, such configuration violates the load balancing condition and cannot be performed. Thus, the final action is not to move (Status Quo) and create an additional 2 replicas.

Edge removal: When an edge between u and v is removed the algorithm consequently removes the replica of u in the partition holding the master of node v if no other node requires it and vice-versa. The algorithm checks whether there are more than K slave replicas before removing the node so that the desired redundancy level is maintained.

Server addition: Unlike the previous cases, server addition and removal do not depend on the events of the social graph application but they are externally triggered by system administrators or detected automatically by the system monitoring tools. There are two choices when adding a server: 1) force re-distribution of the masters from the other servers to the new one so that the all servers are balanced immediately, or 2) let the re-distribution of the master be the result of the of the node and edge arrival processes and the load-balancing condition. In the first case, the algorithm will select the $$\frac{N}{M^2 + M}$$

least replicated masters from the M servers (in this embodiment we are considering a one-to-one relation between the number of servers and the number of partitions but this is not mandatory for all the embodiments) and it moves them to the new server M+1. After the movement of the masters, the algorithm will ensure that for all the masters moved to the new server there is a slave replica of their neighbours to guarantee the local data semantics. This mechanism guarantees that the master across all the M+1 are equally balanced, however, it may not provide a minimum replication overhead. Thus, in addition, for a fraction of the edges of the masters involved the algorithm triggers a system-replay edge creation event which reduces the replication over-head. In the second case the algorithm does nothing else than to increase the number of available servers. The edge/user arrival will take care of filling the new server with new user which in turn attract old users when edges to them. This leads to an eventual load balancing of the master across replicas without enforcing movement operations as long as the OSN continues to grow.

Server removal: When a server is removed, whether intentionally or due to a failure, the algorithm re-allocates the N/M master nodes hosted in that server to the remaining M−1 servers equally. Note that in the case of a failure the master replicas will have to be retrieved from servers hosting slave replicas. The algorithm decides in which server a replica is promoted to master based on the ratio of its neighbours that already exist in that server and its number of connections. Thus, highly connected nodes, with potentially many replicas to be moved due to the data local semantics, get to choose first at which server they go. The remaining ones are placed wherever they fit following simple water-filling strategy. As we will see in the evaluation section, this strategy ensures equal repartition of the failed masters while maintaining a small replication cost.

Invention Simulations and Evaluations

The invention can be applied as a middleware of plugin to any data-store (relational databases such as MySQL, Postgres or to key-value stores such as Cassandra, MongoDB, Redis, Memcached).

SPAR's performance evaluations of two different embodiments, using MySQL and Cassandra are detailed below in order to compare them to both random partition and full replication with Cassandra and MySQL implementations. As a reference OSN application it was used Statusnet, an open-source Twitter implementation designed using a centralized architecture (PHP and MySQl/Postgres). Test-bed was composed of a collection of 16 low-end commodity machines, e.g. "little engine(s)", interconnected by a Giga-Ethernet switch. Each machine has a Pentium Duo CPU at 2.33 GHz with 2 GB of RAM and a single hard drive.

Cassandra Running SPAR

Statusnet is designed to run RDBMS as its data-store (MySQL/Postgres). Therefore, to evaluate Cassandra running SPAR it was needed to reproduce the functionality on Statusnet for the data-model specific of Cassandra (version 0.5.0). To emulate Statusnet functionality, it was defined a data scheme that contains information of users, tweets and the list of tweets that the users are subscribed. It was also implemented the data scheme using different columns and super columns. To implement SPAR, first it was disabled the default random partitioning algorithm of Cassandra by creating independent instances of Cassandra. All the Cassandra nodes, in that system, do not communicate with each other so it was had full control of the location of the information (users and tweets). The middleware provide basic operations needed for Statusnet application. For instance, it was implemented the operation to retrieve the last 20 tweets of a given user. Next we compare the performance of the SPAR instantiation in Cassandra and the standard Cassandra with random partition.

In order to evaluate the impact that SPAR have on the response times comparing it to random partitioning, it was performed a set of experiments: It was randomly selected 40K users out the Twitter dataset and issue requests to retrieve the last 20 tweets at a rate of 100, 200, 400 and 800 requests per second.

Figure 4:
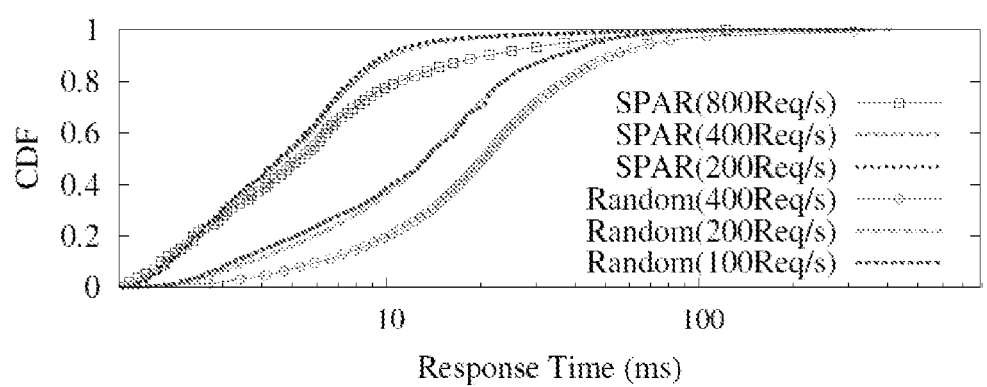
FIG. 4 shows a graph with response times of present invention SPAR compared to random partitioning.

FIG. 4 shows response time of SPAR and the default Cassandra using random partitioning. It can be observed that SPAR reduces the average response time by 77% (400 requests/second). Additionally, it was also measured that SPAR can support a 99 percentile response time below 100 msec. SPAR provides the same quality of service for a request rate of 800 req/s, while Cassandra random can only provide such performance for ¼ of the request rate.

MySQL Running SPAR

In other embodiment of present invention was evaluated the performance of SPAR scaling a Twitter application using MySQL. The importance of this matter emerges when it allows developers to keep using the familiar RDBMS framework without worrying about its scalability. It was tested if Statusnet might deal with the demand of Twitter as for December 2008. However it was deliberately chosen commodity servers to underscore the point that it can be used SPAR with such commodity machines to reach Twitter-level. It was used MySQL version 5.5 together with the SQL data scheme that is used is by Statusnet. The schema contains SQL tables related to the users (table user and profile), the social graph (subscription), tweets (notice) and the list of tweets per user (notice inbox). It was adapted this Twitter dataset to the Statusnet data scheme, so that it contains all information about users and tweets. It was retrieved the last 20 tweets per user by performing a single query using a join on the notice and notice inbox tables.

As stress-test it was set-up a Tsung testing tool and a cluster of two machines that can easily emulate the activity for tens of thousands of concurrent users. It was generated both read operations (retrieve the last 20 tweets) and write operations (generate a new tweet and update the inboxes). That experimental evaluation consisted of multiple 4 minutes sessions where it was queried for the last tweets of a random subset of users with a constant request rate. It was assured that every user is queried only once per session, and the requests are spread evenly among servers.

In order to effectuate a comparison to full replication it was check whether a scheme that is based on full replication can work in practice. This would mean loading the entire Twitter dataset on all machines and measure the number of users that the system can serve. The average 95th percentile of the response time per user was 113 ms for 16 users/second (1 user per second per machine), 151 ms for 160 users/second, and 245 ms for 320 users/second. The 99th percentiles are even higher with 152 ms for 16 users/second. On the other hand, when SPAR was used, the cluster can serve more than 2,500 users/second with a 99th percentile of less than 150 ms.

This highlights that SPAR using a MySQL data store is able to withstand Twitter-scale read loads with a small cluster of commodity machines, while a full replication system such as that implemented with MySQL is not able to cope.

Although the present invention has been described with reference to specific embodiments, it should be understood by those skilled in the art that the foregoing and various other changes, omissions and additions in the form and detail thereof may be made therein without departing from the spirit and scope of the invention as defined by the following claims.

The invention claimed is:

1. A method for scaling usage of a social based application on an online social network,
the online social network comprising a plurality of user profiles, each user profile associated with one user of a plurality of users, the plurality of users selectively interacting in online relationships with each other in the social based application;
a plurality of servers interconnected by a communications network, the plurality of servers comprising a plurality of processors and a plurality of computer readable non-transitory data storages, the plurality of non-transitory computer readable data storages comprising a plurality of partitions;
each user profile of the plurality of user profiles being associated with a single master replica of the user profile and a plurality of master's slave replica of the user profile,
for each respective user, the master replica being stored in one partition in one of the servers of the plurality of server, the one partition also storing a master replica or a master's slave replica of all the neighbor users of the respective user, the neighbor users being defined as the users with an online relationship established with the respective user;
when a new online relationship is created between a first user and a second user of the plurality of users, the first user having first user profile, a first master replica, and a first master's slave replica and a second user having a second user profile, a second master replica, and a second master's slave replica,
the method executing on a respective one of the processors and comprising the steps of:
 (a) checking if the first master replica and the second master replica are stored in the same partition or if the first master replica is stored with the second masters slave replica in the same partition,
 (b) if step (a) is answered in the affirmative taking no further action;
 (c) if step (a) is answered in the negative, determining the least number of replicas to be generated when
  (i) the first master replica and the second replica are not moved to another partition,
  (ii) the first master replica is moved to a partition associated with the second master replica, and
  (iii) the second master replica is moved to a partition associated with the first master replica;
wherein step (c) is performed so that the plurality of master replicas are balanced among the plurality of partitions; every user has at least K replica slaves, where K is a design parameter, and every master replica of a user has, on the same partition where said master replica is stored, a master replica or a master's slave replica of all the users with an online relationship established with said user; and
 (d) selecting and applying from the previous configurations of step (c) the one yielding a smallest aggregate number of replicas.

2. The method of claim 1, wherein each partition is disposed in a server of the social based application.

3. The method of claim 1, wherein the method executes as a middleware.

4. The method of claim 3, wherein the middleware comprises a relational database.

5. The method of claim 4, wherein the relation database is chosen from the group consisting of MySQL, Postgres, and Key-value stores and wherein Key-value stores are chosen from the group consisting of Cassandra, MongoDB, Redis, and Memcached.

6. The method of claim 1, wherein when a new partition is added, the method further comprises redistributing the plurality of master replicas from the plurality of partitions to the new partition by
selecting $N/(M^2+M)$ number of master replicas having a least number of master's slave replicas and moving them to the new partition, where N is number of the plurality of user profiles and M the number of partitions without the new partition;
ensuring that for all the master replicas moved to the new partition there is a master's slave replica of their neighbor users; and balancing equally the master replicas across all the partition.

7. The method of claim 1, wherein when a partition of the plurality of partitions is unavailable, the method further comprises reallocating equally the master replicas stored in the unavailable partition by
    retrieving the masters slave replicas of the master replicas stored in the unavailable partition; and
    determining in which partition a master's slave replica is promoted to a master replica based on a ratio of the master's slave replica's existing neighbor users in said partition and the master's slave replica's number of connection.

8. A system for scaling usage of a social based application in an online social network, the system comprising:
    a plurality of servers interconnected by a communications network;
    a plurality of processors disposed in the plurality of servers;
    a plurality of computer readable non-transitory data storages;
    wherein the online social network comprises a plurality of user profiles, each user profile associated with one user of a plurality of users, the plurality of users selectively interacting in online relationships with each other in the social based application; each user profile of the plurality of user profiles being associated with a single master replica of the user profile and a plurality of master's slave replica of the user profile,
    a plurality of partitions disposed in the plurality of non-transitory computer readable data storages;
        wherein for each respective user, one of the plurality of partitions in one of the servers of the plurality of servers stores the master replica, the one partition also storing a master replica or a master's slave replica of all the neighbor users of the respective user, the neighbor users being defined as the users with an online relationship established with the respective user;
        wherein when a new online relationship is created between a first user and a second user of the plurality of users, the first user having a first user profile, a first master replica, and a first master's slave replica and a second user having a second user profile, a second master replica, and a second master's slave replica, the system further comprises computer executable code causing, when executed, a respective one of the processors to perform the steps of:
            (a) checking if the first master replica and the second master replica are stored in the same partition or if the first master replica is stored with the second master's slave replica in the same partition,
            (b) if step (a) is answered in the affirmative taking no further action;
            (c) if step (a) is answered in the negative, determining the last number of replicas to be generated when
                (i) the first master replica and the second replica are not moved to another partition,
                (ii) the first master replica is moved to a partition associated with the second master replica, and
                (iii) the second master replica is moved to a partition associated with the first master replica;
                wherein step (c) is performed so that the plurality of master replicas are balanced among the plurality of partitions; every user has at least K replica slaves, where K is a design parameter, and every master replica of a user has, on the same partition where said master replica is stored, a master replica or a master's slave replica of all the users with an online relationship established with said user; and
            (d) selecting and applying from the previous configurations of step (c) the one yielding a smallest aggregate number of replicas.

9. The system of claim 8, wherein each partition is disposed in a server of the social based application.

10. The system of claim 8, wherein when a new partition is added, the the plurality of master replicas is redistributed from the plurality of partitions to the new partition wherein
    the new partition comprises $N/(M^2+M)$ number of master replicas, where N is number of the plurality of user profiles and M the number of partitions without the new partition;
    for all the master replicas moved to the new partition there is a master's slave replica of their neighbor users; and
    the master replicas are balanced across all the partition.

11. The system of claim 8, wherein when a partition of the plurality of partition is unavailable, another partition comprising a master's slave replica of the master replicas stored in the unavailable partition is promoted to a master replica based on a ratio of the master's slave replica's existing neighbor users in said partition and the master's slave replica's number of connections.

* * * * *